(12) United States Patent
Kadeřábek et al.

(10) Patent No.: US 11,882,137 B2
(45) Date of Patent: Jan. 23, 2024

(54) NETWORK SECURITY BLACKLIST DERIVED FROM HONEYPOT STATISTICS

(71) Applicant: Avast Software s.r.o., Prague (CZ)

(72) Inventors: Petr Kadeřábek, Prague (CZ); Vladislav Iliushin, Prague (CZ)

(73) Assignee: AVAST SOFTWARE, S.R.O., Prague (CZ)

(*) Notice: Subject to any disclaimer, the term of this patent is extended or adjusted under 35 U.S.C. 154(b) by 178 days.

(21) Appl. No.: 16/659,027

(22) Filed: Oct. 21, 2019

(65) Prior Publication Data

US 2021/0120022 A1    Apr. 22, 2021

(51) Int. Cl.
*H04L 29/06* (2006.01)
*H04L 9/40* (2022.01)

(52) U.S. Cl.
CPC ........ *H04L 63/1425* (2013.01); *H04L 63/101* (2013.01); *H04L 63/1491* (2013.01); *H04L 63/20* (2013.01)

(58) Field of Classification Search
CPC . H04L 63/1425; H04L 63/101; H04L 63/164; H04L 63/1416; H04L 63/1491; H04L 63/20
USPC ......................................................... 726/23
See application file for complete search history.

(56) References Cited

U.S. PATENT DOCUMENTS

| | | | | |
|---|---|---|---|---|
| 7,854,001 | B1 * | 12/2010 | Chen | H04L 63/1483 726/22 |
| 8,661,544 | B2 | 2/2014 | Yen et al. | |
| 9,577,728 | B1 * | 2/2017 | van Nee | H04L 1/0019 |
| 10,516,671 | B2 * | 12/2019 | Nakata | H04L 63/1433 |
| 2005/0278779 | A1 | 12/2005 | Koppol et al. | |
| 2019/0333099 | A1 * | 10/2019 | Sohum | H04L 63/101 |
| 2020/0175085 | A1 * | 6/2020 | Haas | G06F 16/9537 |

FOREIGN PATENT DOCUMENTS

| | | |
|---|---|---|
| CN | 100384143 C | 4/2008 |
| CN | 106982206 A | 7/2017 |
| EP | 3346666 A1 | 7/2018 |

OTHER PUBLICATIONS

Open Source Security, https://web.archive.org/web/20190913203849/https://www.pfsense.org/, 3 pages. Accessed Feb. 27, 2020.
Avast Firewall, https://web.archive.org/web/20180106051130/https://www.avast.com/f-firewall, 7 pages. Accessed Feb. 27, 2020.
Manual 0 8, https://web.archive.org/web/20190902085935/https://www.fail2ban.org/wiki/index.php/MANUAL_0_8, 11 pages. Accessed Feb. 28, 2020.

* cited by examiner

*Primary Examiner* — Longbit Chai
(74) *Attorney, Agent, or Firm* — AVEK IP, LLC; Mark C. Young; William B. Kircher

(57) ABSTRACT

Data relating to attacks is collected in honeypots, including network address of attacks and time of attacks. The attack data is analyzed to generate a predicted likelihood of future attacks from network addresses in the activity data, and a network address blacklist is constructed including network addresses predicted likely to be a source of a future attack. The process is repeated over time, such that network addresses with no recent honeypot activity are removed from the blacklist.

20 Claims, 5 Drawing Sheets

| FEATURE | VALUES | SCORE |
|---|---|---|
| NUMBER OF HONEYPOTS ATTACKED | <= 5 | 0 |
| | > 5 | 139 |
| TIME FROM FIRST TO LAST ATTACK | 0 | 0 |
| | 0+ - 8 DAYS | 45 |
| | > 8 DAYS | 183 |
| TIME FROM LAST ATTACK | < 8 DAYS | 268 |
| | 8 - 31 DAYS | 112 |
| | > 31 DAYS | 0 |
| MEAN TIME FROM ATTACKS | < 31 DAYS | 32 |
| | 31 - 41 DAYS | 24 |
| | > 41 DAYS | 0 |
| TIME FROM LAST ATTACK FROM THE SAME /24 SUBNET | < 1 DAY | 116 |
| | 1 - 9 DAYS | 69 |
| | > 9 DAYS | 0 |

| FEATURE | VALUES | SCORE |
|---|---|---|
| NUMBER OF HONEYPOTS ATTACKED | <= 5 | 0 |
|  | > 5 | 139 |
| TIME FROM FIRST TO LAST ATTACK | 0 | 0 |
|  | 0+ - 8 DAYS | 45 |
|  | > 8 DAYS | 183 |
| TIME FROM LAST ATTACK | < 8 DAYS | 268 |
|  | 8 - 31 DAYS | 112 |
|  | > 31 DAYS | 0 |
| MEAN TIME FROM ATTACKS | < 31 DAYS | 32 |
|  | 31 - 41 DAYS | 24 |
|  | > 41 DAYS | 0 |
| TIME FROM LAST ATTACK FROM THE SAME /24 SUBNET | < 1 DAY | 116 |
|  | 1 - 9 DAYS | 69 |
|  | > 9 DAYS | 0 |

FIG. 3

EXAMPLE:
- IP WITH A SINGLE ATTACK OF ONE HONEYPOT THREE DAYS AGO
- NO OTHER ATTACKS FROM THE SAME /24 SUBNET.
- THRESHOLD = 400

RESULTS:
- TOTAL SCORE = 369
- 369 < 400 ⇒ IP IS NOT BLACKLISTED (HIGHER SCORE = HIGHER ATTACK PROBABILITY)

300

| FEATURE | VALUES | SCORE |
|---|---|---|
| NUMBER OF HONEYPOTS ATTACKED<br>EXAMPLE: 1 | <= 5 | 0 |
|  | > 5 | 139 |
| TIME FROM FIRST TO LAST ATTACK<br>EXAMPLE: 0 | 0 | 0 |
|  | 0+ - 8 DAYS | 45 |
|  | > 8 DAYS | 183 |
| TIME FROM LAST ATTACK<br>EXAMPLE: 3 DAYS | < 8 DAYS | 268 |
|  | 8 - 31 DAYS | 112 |
|  | > 31 DAYS | 0 |
| MEAN TIME FROM ATTACKS<br>EXAMPLE: 3 DAYS | < 31 DAYS | 32 |
|  | 31 - 41 DAYS | 24 |
|  | > 41 DAYS | 0 |
| TIME FROM LAST ATTACK FROM THE SAME /24 SUBNET | < 1 DAY | 116 |
|  | 1 - 9 DAYS | 69 |
|  | > 9 DAYS | 0 |
| TOTAL SCORE |  | 369 |

NETWORK SECURITY BLACKLIST DERIVED FROM HONEYPOT STATISTICS

FIELD

The invention relates generally to security in computerized systems, and more specifically to a network security blacklist derived from honeypot statistics.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, web site scanning tools are used to verify the security and integrity of a website, and to identify and fix potential vulnerabilities.

For example, a firewall in a home or office may restrict the types of connection and the data that can be transferred between the internal network and an external network such as the Internet, based on firewall rules and characteristics of known malicious data. Antivirus or antimalware software executes on a computer, smartphone, or other device, examining executable code as well as running software for malicious activity. Antivirus or firewall software may restrict computer systems from communicating with other systems with network addresses previously known to be malicious, such as by using a network address blacklist. Other systems for intrusion detection and prevention include honeypots, which are decoy computer systems designed to attract the attention of an attacker or intruder, and to gather information regarding attempts at unwanted computer access. Honeypots do not therefore replace traditional security services such as a firewall or other security appliance, but are an additional tool that can be useful in determining information such as when and how an attacker has breached a network's security, and the network address of the attacker.

But, new threats are constantly emerging, and attackers frequently change network addresses and methods of attack. Efficient and timely detection of malicious threats and security breaches remains a significant challenge. It is therefore desirable to manage analysis of network threats to provide timely and efficient characterization of vulnerabilities, such as with malware signatures and network address blacklists.

SUMMARY

One example embodiment comprises a method of generating a network address blacklist from data relating to attacks on honeypots. Attack data is collected in honeypots, including network address of attacks and time of attacks, and sent to a network security server. The network security server analyzes the attack data to generate a predicted likelihood of future attacks from network addresses in the activity data, and a network address blacklist is constructed including network addresses predicted likely to be a source of a future attack. The process is repeated over time, such that network addresses with no recent honeypot activity are removed from the blacklist.

In another example, activity data includes number of honeypots attacked, time from first to last attack, time since last attack, mean time of attacks, and/or time from last attack from the same subnet. Activity data is used to predict likelihood of future attacks from the same network address (such as IP address or IP subnet) by logistic regression using historic data. An updated blacklist is then distributed to end user devices and/or to cloud security services, such as a firewall, antivirus software, or antimalware software.

The details of one or more examples of the invention are set forth in the accompanying drawings and the description below. Other features and advantages will be apparent from the description and drawings, and from the claims.

BRIEF DESCRIPTION OF THE FIGURES

FIG. 2 is a chart showing construction of a honeypot-based network address blacklist, consistent with an example embodiment.

FIG. 3 is a chart showing application of a honeypot-based network address blacklist to an example data set, consistent with an example embodiment.

DETAILED DESCRIPTION

Figure 1:
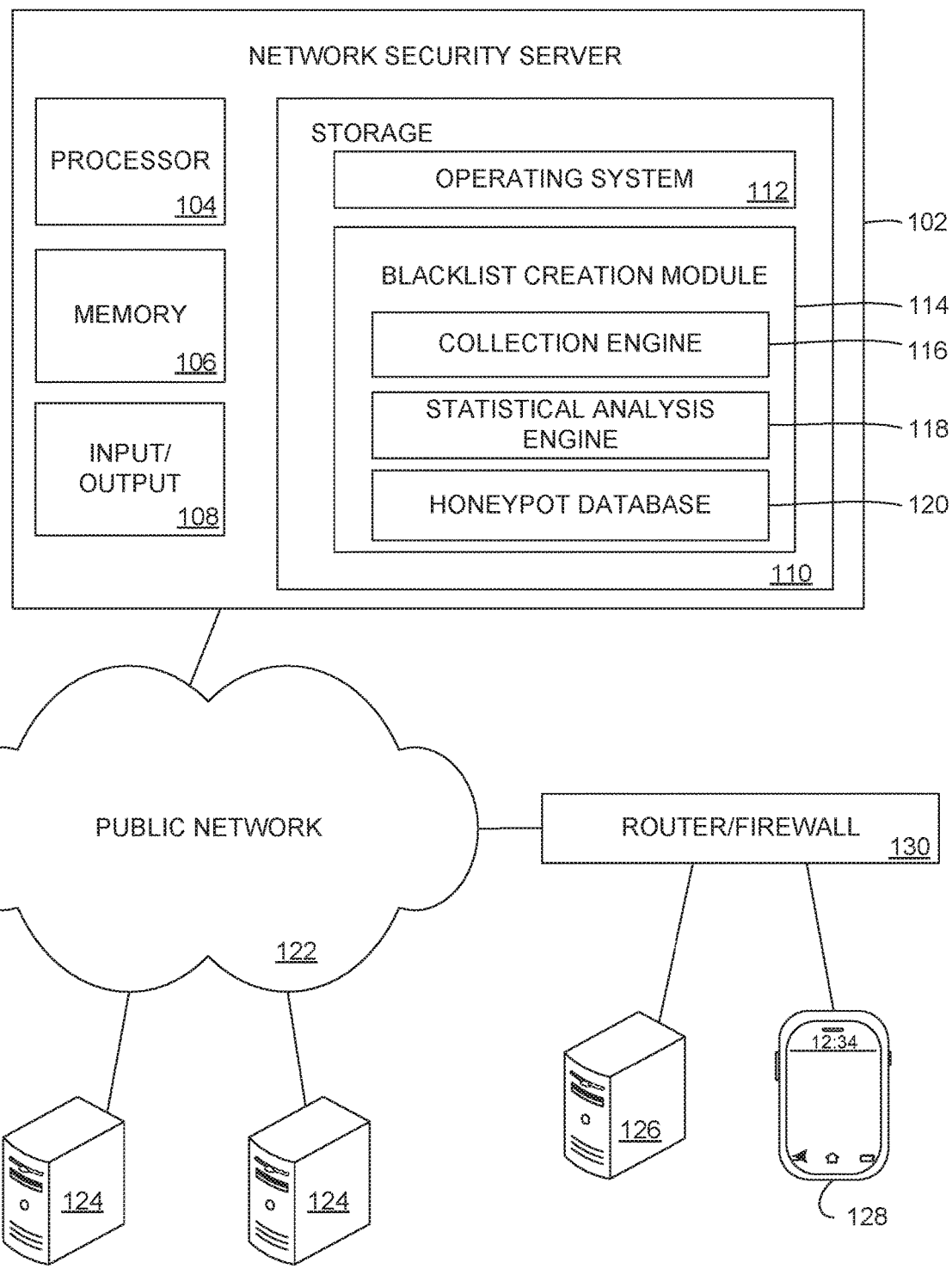
FIG. 1 shows a network security server operable to generate a blacklist from honeypot attack data, consistent with an example embodiment.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to computers to steal, delete, or change information, or to encrypt the information and hold it for ransom via "ransomware." Smartphone apps, Microsoft Word documents containing macros, Java applets, and other such common documents are all frequently infected with malware of various types, and users rely on tools such as antivirus software or other malware protection tools to protect their computerized devices from harm. Further, an increasing number of devices such as home appliances, vehicles, and other devices are connected to public networks and are susceptible to unauthorized interception or modification of data.

In a typical home computer or corporate environment, firewalls inspect and restrict the types of communication that can occur between local devices such as computers or IoT devices and the Internet, antivirus programs prevent known malicious code from being loaded or executed on a computer system, and malware detection programs detect known malicious code such as remailers, keystroke loggers, and other software that is designed to perform undesired operations such as stealing information from a computer or using the computer for unintended purposes. These security mechanisms use a variety of methods to prevent malicious activity, including searching executable code for signatures or characteristics of known malicious software, and blocking network traffic from network addresses known or suspected to be malicious.

Antivirus or anti-malware software and firewalls use signatures and heuristic data sets to recognize various threats, and the signatures and heuristic data sets are updated frequently by a service provider that monitors the emergence of new threats. Similarly, blocking network addresses known or suspected to be involved with malicious activity, such as Internet Protocol (or IP) addresses, is often performed with a blacklist of IP addresses also distributed and updated by a security system provider. Timely and efficient distribution of up-to-date signatures, heuristics, and blacklists is therefore an important part of being able to accurately and efficiently detect threats.

Some examples described herein therefore seek to provide an efficiently-sized and timely blacklist of malicious network addresses by using statistical analysis of data collected from a group of honeypot systems. In a more detailed example, data is collected in honeypots, including network address of attacks and time of attacks. The attack data is analyzed to generate a predicted likelihood of future attacks from network addresses in the activity data, and a network address blacklist is constructed including network addresses predicted likely to be a source of a future attack. The process is repeated over time, such that network addresses with no recent honeypot activity are removed from the blacklist.

In another example, activity data includes number of honeypots attacked, time from first to last attack, time since last attack, mean time of attacks, and/or time from last attack from the same /24, ASN, or other subnet. Activity data is used to predict likelihood of future attacks from the same network address (such as IP address or IP subnet) by logistic regression using historic data. An updated blacklist is then distributed to end user devices and/or to cloud security services, such as a firewall, antivirus software, or antimalware software.

FIG. 1 shows a network security server operable to generate a blacklist from honeypot attack data, consistent with an example embodiment. Here, network security server 102 comprises a processor 104, memory 106, input/output elements 108, and storage 110. Storage 110 includes an operating system 112, and a communication module blacklist creation module 114 that is operable perform various functions related to creating and maintaining a blacklist of known or suspected malicious computer systems, identified by their network addresses. The blacklist creation module 114 further comprises a data collection engine 116 operable to collect and store data from other systems, such as activity data from honeypot systems set up to detect malicious activity. Statistical analysis engine 118 is operable to evaluate historic activity data to determine logistic regression coefficients regarding the way in which various activity data is predictive of future malicious activity, and perform statistical analysis on newly-collected activity data to determine which network addresses are statistically likely to be a source of future malicious activity. Honeypot database 120 stores both historic and newly-collected activity data, which is used in this example both for generating statistical metrics using historic data and for generating an up-to-date, compact blacklist using recent or current data, such as data within the last several weeks or months.

The network security server 102 is coupled to a public network 122, such as the Internet, and to a number of remote computer systems 124. Some of these remote systems 124 are malicious computer systems, which probe other computers on the network for vulnerabilities to perform malicious activity such as stealing data or computing resources from the other computers. These malicious computer systems often do not target a single computer for attack, but attack whatever other computer systems they find on the public network. Some remote systems 124 are therefore configured as honeypots that work in conjunction with network security server 102, luring malicious users to attack honeypot systems set up for the purpose of attracting and recording malicious attacks.

Router/firewall 130 is also connected to the public network 122, and links a private or local network to the public network. Private network devices such as computer 126 and smartphone 128 exchange information with computers on the public network through router/firewall 130, which performs various functions such as network address translation between the private and public networks, and protects the private network devices from some threats via its firewall. When a blacklist is created by network security server 102, it is used in security systems such as the firewall in router/firewall 130, a cloud security service, and antivirus or anti-malware software on end user devices such as computer 126 and smartphone 128 to help prevent malicious activity in those devices. But, the size of the blacklist can grow very large if too many network addresses are included, such as network addresses of systems that have only been detected as potentially malicious one time, or that have not been detected as performing potentially malicious activity recently.

Because no legitimate users should have a reason to attempt to access the honeypot systems in communication with network security server 102, any attempt to access the honeypot is assumed to be an attack with malicious intent. Multiple attacks make it statistically more likely that the attack is deliberate and malicious, as do more frequent attacks or attacks on multiple honeypots. Attacks in this example are defined as an attempt to interact with the honeypot, which serves no useful purpose other than to attract malicious attackers. In other examples, attacks include other activity that can be characterized or identified as malicious, such as an attempt to breach a router or firewall, an attempt to contact a number of private network devices on the same destination port, or other such activity having a high probability of having malicious intent.

Because the honeypots 124 in this example are not configured to be used as actual productive computer systems such as for serving data or providing other functionality to users, they may not include all the hardware or software typically associated with a computer system. For example one or more honeypots may be emulated on a computerized device or within a virtual machine or virtual machines. The honeypots in some examples will be left relatively unprotected by a firewall or other protection, so that unauthorized attempts by other computers to access the honeypots can be captured and analyzed. The honeypots are configured to appear to public network devices as real, operational computerized devices, and in some examples will include or will emulate firmware, an operating system, or specialized hardware such as a video camera or server to ensure that the honeypot device responds as expected to interaction from other public network computers 124.

The honeypots in a more detailed example are implemented by adding virtual endpoints such as Internet Protocol (IP) addresses to the private network, that respond to standard network discovery attempts such as Address Resolution Protocol (ARP) requests, ICMP pings, HTTP or other service requests to IoT devices, and other such network requests often used to find and communicate with systems on a network. The honeypots therefore appear to other systems such as other network computers 124 to be a part of the network. Traffic destined to honeypot IP addresses is directed to a server or other device hosting the honeypot, such that the honeypot appears to be an actual functioning device on the network.

Honeypots in some examples may be located on an internal or private network, or may be located on the external or public side of the firewall, such as is often the case with Internet servers and other such systems. As honeypot systems provide no real services to users they should receive very little traffic, and a pattern of unusual traffic from a network address or subdomain to a honeypot 124 can be presumed to have malicious intent. Repeated attacks from the same network address or subdomain are a stronger indicator of malicious intent. In another example, activity data is collected from data sources other than standalone honeypots, such as from a home or office router or firewall that is configured to capture traffic data that is deemed malicious, such as network traffic destined for closed communications ports or several different devices on the local network. For example, an attacker attempting to access the same closed port on five different private network devices is almost certainly malicious, and a router or firewall may report such information as a honeypot.

Although the honeypots in this example are single computerized systems, in other examples they may be another type of networked device or server, a network segment or subnet, or an elaborate virtual network environment configured to attract the attention of attackers. The honeypots in various such examples includes mail servers, database servers, or other systems that provide information or services that may be attractive to an attacker. Although some honeypots may include minimal resources, such as only those most likely to be accessed by an attacker, others will appear to be fully operational systems, using standard operating systems and other software, making them more difficult for an attacker to recognize as a potential honeypot.

In operation, honeypots 124 monitor network activity and collect data, reporting various attempts to communicate with or gain access to the honeypots to network security server 102. The collected data includes the network address (such as Internet Protocol or IP address) of the attacker, as well as other information such as the time of the attack, the type of attack, and the port number, service, or resource being attacked. The network security server 102 retrieves this data from the honeypots via its collection engine 116, and records information regarding the attack in its honeypot database 120 along with a record of what data was collected by which honeypot system. The statistical analysis engine 118 uses historical data from honeypot database 120 to determine how various collected data indicates the likelihood of future malicious activity from the same network address or subnet, such as by calculating logistic regression coefficients. It then uses current or recent data collected from the honeypots and the statistical coefficients to predict which network addresses or subnets meet a statistical threshold for probability of generating future attacks, and creates a blacklist of network addresses. The blacklist is distributed to systems that employ it for protection from network threats, such as router/firewall 130, end user devices such as computer 126 and smartphone 128, and cloud security services.

This process creates a blacklist that intentionally omits network addresses that have not been involved in multiple attacks, that have not been involved in attacks recently, or that are otherwise statistically unlikely to be the source of future attacks. The blacklist's size is therefore greatly reduced relative to traditional methods such as simply collecting every network address associated with an apparent attack, reducing the resources needed to distribute, store, and process the blacklist while retaining the vast majority of the benefit of having a blacklist.

FIG. 2 is a chart showing construction of a honeypot-based network address blacklist, consistent with an example embodiment. Here, various "features" are derived from data collected in the honeypots for an attacker from a specific network address, including data such as the number of different honeypots attacked by the network address, the time between the first and last attack from the network address, the time since the last attack from the network address, the mean time from all attacks from the network address (which in a further example may be windowed or time-limited, such as the mean time from all attacks over the past year), and the time from the last attack from any network address in the same /24, ASN, or other subnet as the network address.

For each of the features, different value bins and associated scores are established via a process such as logistic regression. In the example of FIG. 2, no feature has more than three bins, and the values for each bin are determined based on the distribution of feature data and the correlation of the distribution of feature data to the likelihood that a network address with a particular feature value will be involved in another attack. For example, the number of honeypots attacked in this example has two bins, one for five or fewer honeypots and one for more than five honeypots. This suggests that attacks on more than five honeypots is strongly indicative of an increased likelihood that a network address will be involved in a future attack, while attacks on five or fewer honeypots suggests the network address may likely not be a source of future attacks.

Each feature value bin also has a score, determined in this example by logistic regression, which when added to the scores for feature value bins for other features generates a final score for a particular network address. Returning the first feature as shown at 202, the number of honeypots attacked, it can be seen that five or fewer honeypots attacked is associated with a score of zero, indicating that values of five or fewer do not strongly suggest that the network address will be involved in a future attack. If more than five honeypots are attacked by the network address, the feature bin score is 139, which suggests that seeing attacks in more than five honeypots from the same network address does strongly suggest that the network address is likely to be involved in future attacks. This reflects the tendency of attackers to scan through a large number of network addresses in looking for weaknesses or vulnerabilities, and helps distinguish likely malicious network addresses from those accidentally contacting a honeypot system.

For each of the five features shown in FIG. 2, the features are split into different value bins based on the predictive weight of different values for each feature in determining the likelihood of a future attack. Here, it can be easily seen that a number of honeypots attacked of five or fewer is associate with a score of zero, meaning that feature values falling into this bin do not suggest that the network address is likely to be the source of a future attack. Similarly, if the time from the first to last attack for the network address is zero days (i.e., have the same timestamp), or the time since the last attack is greater than 31 days, these feature values are also indicative of a low likelihood that the network address is likely to be the source of a future attack. When the score values for each of the five features is added up, the sum is compared to a threshold value (such as 400), such that if the sum is lower than the threshold the network address is determined to be unlikely to be the source of a future attack and is left off the blacklist. Conversely, if the sum equals or exceeds the threshold value, the network address is added to the blacklist because the probability of the network address being the source of a future attack is sufficiently high to meet the threshold.

The example of FIG. 2 sorts the feature values into one of two or three bins having associated values to generate a score, but other examples will use more bins, will have a number of value bins that varies more greatly by feature, or will use other methods such as fitting the logistic regression to a curve or linear segments rather than using bins. In one such example, a number of honeypots fewer than two has a score of zero, while a number of honeypots between two and ten has a score of 20 times the number of honeypots, and a number of honeypots of ten or over has a score of 200. Such a piecewise linear scoring system is easy and efficient to code and to understand, and may produce a more accurate result in some embodiments than using bins. In another example, continuous functions such as linear correspondence with feature values, square and/or cubes of feature values, or square and/or cube roots of feature values are used to determine the score associated with each feature, or functions of more than one feature are employed to take advantage of a relationship or correlation between the predictive power of related features.

FIG. 3 is a chart showing application of a honeypot-based network address blacklist to an example data set, consistent with an example embodiment. Here, a networked computer having a specific IP address attacked a honeypot three days ago, and there have been no other attacks from the same /24, ASN, or other subnet. A /24 subnet is a subnet of network addresses having the same first 24 bytes, but in which the last byte varies, such as 192.168.1.0-192.168.1.255 (sometimes also referenced by a subnet mask such as 255.255.255.0). If logistic regression has set a threshold value of 400, we can look at the scores generated by each of the five different features and the bin scores associated with the value for each feature, and add the scores to calculate a total score or sum of 369. Because the total score of 369 is lower than the threshold of 400, this recent single attack does not indicate that a future attack from the same network IP address is likely, and so the IP address is not placed on the blacklist.

Figure 4:
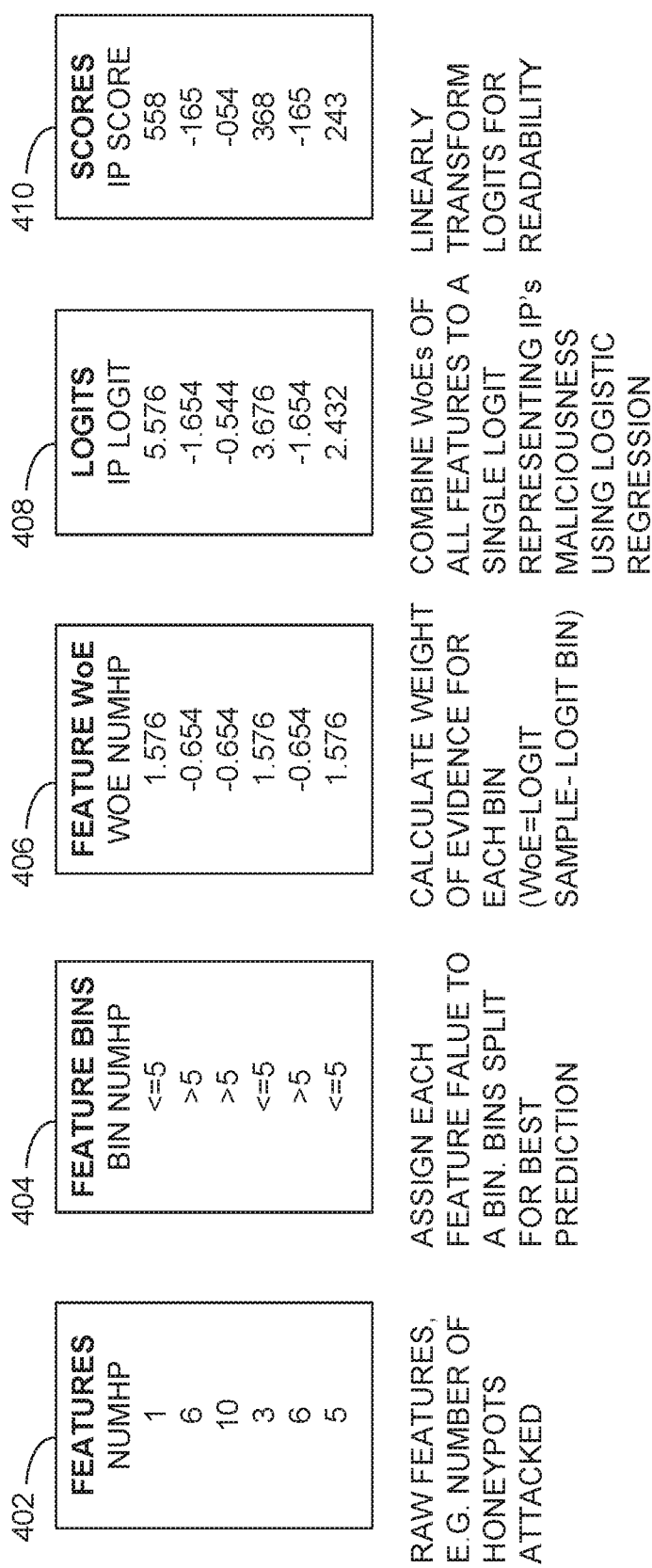
FIG. 4 shows application of logistic regression to a network address feature, consistent with an example embodiment.

FIG. 4 shows application of logistic regression to a network address feature, consistent with an example embodiment. At 402, raw feature data is shown for five different addresses, which in this example is the number of honeypots that each of the six network addresses in the table has accessed. The number of honeypots accessed in this example ranges from one to ten. At 404 the feature is divide into bins, which in this example feature are a first bin representing fewer than five honeypots and a second bin representing five or more honeypots. The number of bins and the feature value that divides one bin from another can be determined by estimation, trial and error, or logistic regression or other statistical means. A weight of evidence transformation is performed for each of the six network addresses at 406, based on the feature bin into which the feature falls. In this example, features falling into the first feature bin of values less than or equal to five have a value of 1.576, while features falling into the second bin of values greater than five have a weight of evidence value of −0.654. The weight of evidence value of each bin is determined in this example by using logits for the feature sample values falling into each of the bins.

At 408, logits for each of the network IP addresses are calculated, based on weight of evidence of the feature from 402-406 (number of honeypots accessed) as well as all other features being considered for each of the six IP addresses listed in the table. The logits are then normalized to vary within a desired range at 410 for readability, which in this example are represented by high scores corresponding to a high likelihood of future attacks and low scores corresponding to a low likelihood of future attacks from each of the IP addresses. The weight of evidence from 406 correspond to the bin scores for each of the features in the examples of FIGS. 2 and 3, and the final scores in 408 and 410 correspond to the final score of all features compared against the threshold value in FIG. 3.

Figure 5:
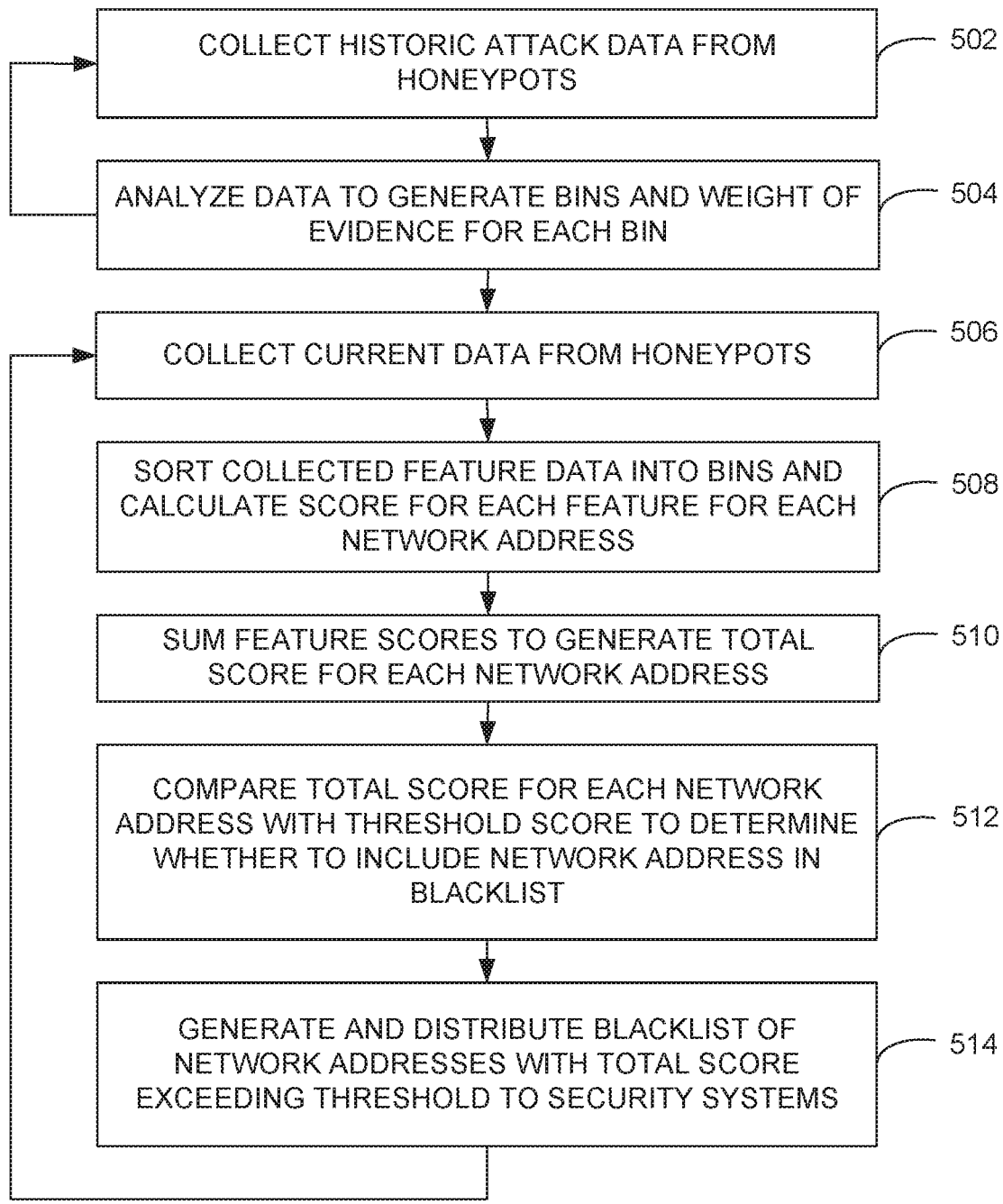
FIG. 5 is a flowchart of a method of generating a network address blacklist, consistent with an example embodiment.

FIG. 5 is a flowchart of a method of generating a network address blacklist, consistent with an example embodiment. Here, historical attack data from a network of honeypots is collected, including various features of attacks of the honeypots such as the time of each attack and network or IP address of the attacker. This data is analyzed at 504, to determine the ability of each of several features of the data to predict the likelihood of a future attack from the same network address, as illustrated in FIGS. 2-4. More specifically, the data is used to generate bins of feature values for each feature, and to generate logits or logistic regression coefficients for the features to assign a score to each bin, such as by performing a weight of evidence calculation.

At 506, current data is collected from the honeypots, including the same features as the historic data collected at 502. The features are extracted or derived from the data at 508, and the features for each network address are sorted into bins at 508. The feature scores associated with each bin for each feature for each of the network addresses in the current data set are summed at 510 to generate a total score for each network address, indicative of the predicted likelihood of each network address being the source of a future attack. The total score is compared to a threshold score at 512, such that if the total score meets or exceeds the threshold the associated network address is included in the blacklist but if the total score does not meet the threshold the associated network address is not included in the blacklist.

The blacklist is generated or assembled from network addresses that meet or exceed the total score threshold at 514, and is distributed to various security systems such as firewalls, antivirus or antimalware software, network security devices, and cloud security services to be used in protecting computer systems from malicious computers.

The method of FIG. 5 comprises two sub-processes that are repeated over time in this example. First, collecting and analyzing historic data to set bins and logistic regression coefficients at 502-504 is repeated periodically to ensure that the bins, statistical coefficients, and threshold values remain accurate based on recent data (such as data over the past several months or years). A second process of collecting and analyzing current data from honeypots to generate a blacklist as described at 506-514 is repeated more frequently, such as daily or even multiple times per day to ensure that current threats are recognized and accounted for in the blacklist distributed to various computer security systems.

The examples provided here illustrate how statistical analysis of data from a group of honeypots can be used to generate a network address blacklist that is more compact than typical blacklists of any network addresses involved in prior malicious activity while still providing a blacklist likely to include the vast majority of known network addresses likely to be involved in future malicious activity. The blacklist construction examples described herein are straightforward to understand, and it can be easily seen what factors most contribute to determination that a network address should be on the blacklist. Although the blacklist in the above examples is constructed on a network security server such as the server of FIG. 1, other computerized systems will be employed to generate the blacklist and to perform other functions such as honeypot data collection or blacklist distribution in other examples. One example computerized system having a variety of components is detailed below.

Figure 6:
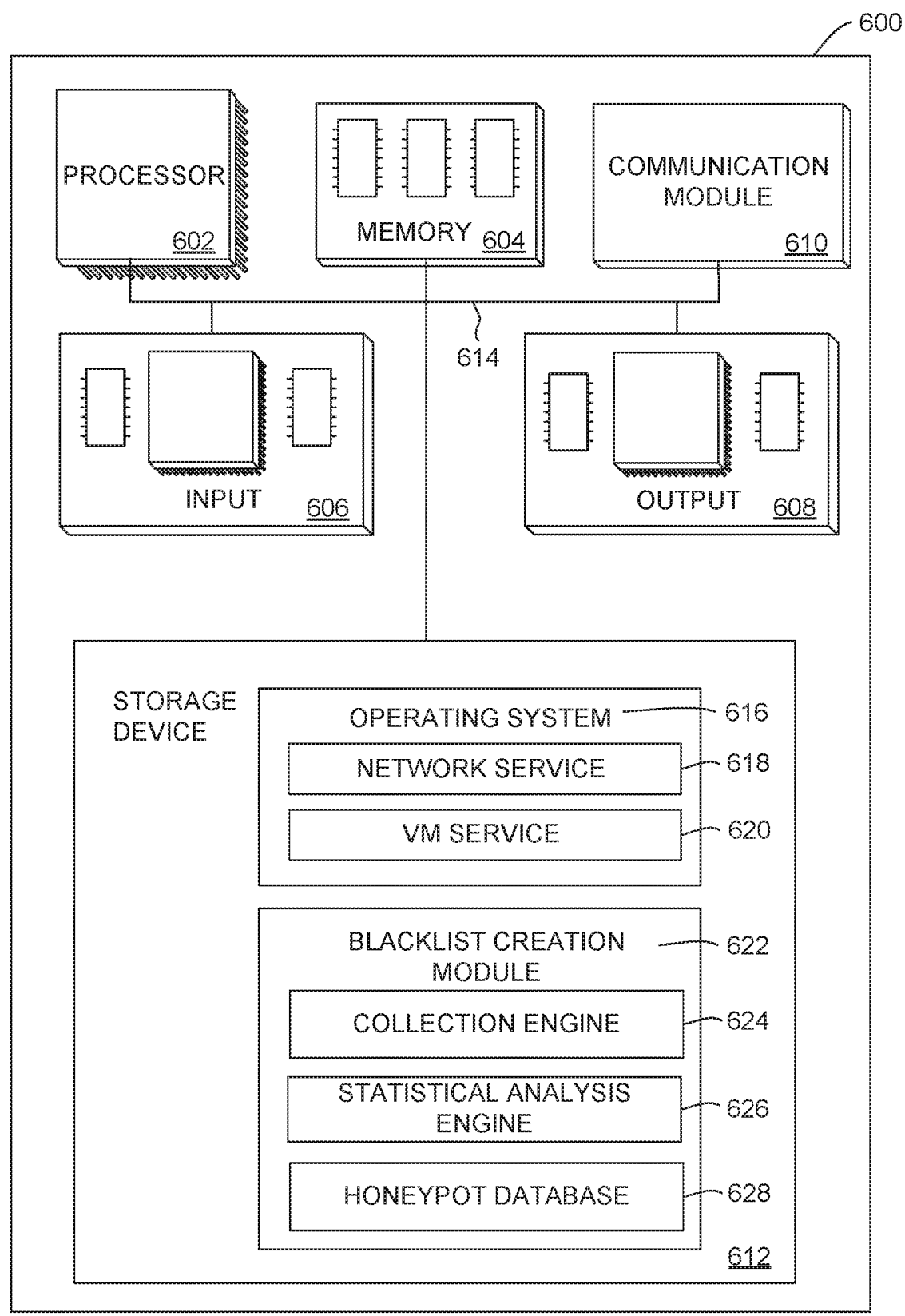
FIG. 6 is a computerized network security device, consistent with an example embodiment of the invention.

FIG. 6 is a computerized network security device, consistent with an example embodiment of the invention. FIG. 6 illustrates only one particular example of computing device 600, and other computing devices 600 may be used in other embodiments. Although computing device 600 is shown as a standalone computing device, computing device 600 may be any component or system that includes one or more processors or another suitable computing environment for executing software instructions in other examples, and need not include all of the elements shown here.

As shown in the specific example of FIG. 6, computing device 600 includes one or more processors 602, memory 604, one or more input devices 606, one or more output devices 608, one or more communication modules 610, and one or more storage devices 612. Computing device 600 in one example further includes an operating system 616 executable by computing device 600. The operating system includes in various examples services such as a network service 618 and a virtual machine service 720 such as a virtual server or virtualized honeypot device. One or more applications, such as blacklist creation module 622 are also stored on storage device 612, and are executable by computing device 600.

Each of components 602, 604, 606, 608, 610, and 612 may be interconnected (physically, communicatively, and/or operatively) for inter-component communications, such as via one or more communications channels 614. In some examples, communication channels 614 include a system bus, network connection, inter-processor communication network, or any other channel for communicating data. Applications such as blacklist creation module 622 and operating system 616 may also communicate information with one another as well as with other components in computing device 600.

Processors 602, in one example, are configured to implement functionality and/or process instructions for execution within computing device 600. For example, processors 602 may be capable of processing instructions stored in storage device 612 or memory 604. Examples of processors 602 include any one or more of a microprocessor, a controller, a digital signal processor (DSP), an application specific integrated circuit (ASIC), a field-programmable gate array (FPGA), or similar discrete or integrated logic circuitry.

One or more storage devices 612 may be configured to store information within computing device 600 during operation. Storage device 712, in some examples, is known as a computer-readable storage medium. In some examples, storage device 612 comprises temporary memory, meaning that a primary purpose of storage device 612 is not long-term storage. Storage device 612 in some examples is a volatile memory, meaning that storage device 612 does not maintain stored contents when computing device 600 is turned off. In other examples, data is loaded from storage device 612 into memory 604 during operation. Examples of volatile memories include random access memories (RAM), dynamic random access memories (DRAM), static random access memories (SRAM), and other forms of volatile memories known in the art. In some examples, storage device 612 is used to store program instructions for execution by processors 602. Storage device 612 and memory 604, in various examples, are used by software or applications running on computing device 600 such as blacklist creation module 622 to temporarily store information during program execution.

Storage device 612, in some examples, includes one or more computer-readable storage media that may be configured to store larger amounts of information than volatile memory. Storage device 612 may further be configured for long-term storage of information. In some examples, storage devices 612 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication modules 610. Computing device 600 in one example uses communication module 610 to communicate with external devices via one or more networks, such as one or more wireless networks. Communication module 610 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 600 uses communication module 610 to wirelessly communicate with an external device such as via public network 122 of FIG. 1.

Computing device 600 also includes in one example one or more input devices 606. Input device 606, in some examples, is configured to receive input from a user through tactile, audio, or video input. Examples of input device 606 include a touchscreen display, a mouse, a keyboard, a voice-responsive system, a video camera, a microphone, or any other type of device for detecting input from a user.

One or more output devices 608 may also be included in computing device 600. Output device 608, in some examples, is configured to provide output to a user using tactile, audio, or video stimuli. Output device 608, in one example, includes a display, a sound card, a video graphics adapter card, or any other type of device for converting a signal into an appropriate form understandable to humans or machines. Additional examples of output device 608 include a speaker, a light-emitting diode (LED) display, a liquid crystal display (LCD), or any other type of device that can generate output to a user.

Computing device 600 may include operating system 616. Operating system 616, in some examples, controls the operation of components of computing device 600, and provides an interface from various applications such as blacklist creation module 622 to components of computing device 600. For example, operating system 716, in one example, facilitates the communication of various applications such as blacklist creation module 622 with processors 602, communication unit 610, storage device 612, input device 606, and output device 608. Applications such as blacklist creation module 622 may include program instructions and/or data that are executable by computing device 600. As one example, blacklist creation module 622 creates and distributes a blacklist of malicious network addresses using collection engine 624, statistical analysis engine 626, and honeypot database 628. These and other program instructions or modules may include instructions that cause computing device 600 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of generating a network address blacklist, comprising:
    collecting activity data in a plurality of honeypots comprising network address of attacks and time of attacks;
    analyzing activity data from the plurality of honeypots to generate a score indicative of a predicted likelihood of future attack from network addresses in the activity data; and
    constructing a network address blacklist including network addresses predicted likely to be a source of a future attack based on the generated score being greater than a threshold value;
    wherein the collecting, analyzing, and constructing are repeated over time such that each past threat is iteratively reassessed over time and the score indicative of a predicted likelihood of future attack is updated to reduce a size of maintaining the generated network address blacklist by removing the network addresses from the blacklist that had no recent honeypot attack activity based on the generated score.

2. The method of generating a network address blacklist of claim 1, wherein the network address comprises an Internet Protocol (IP) address.

3. The method of generating a network address blacklist of claim 2, wherein the network address comprises a range of IP addresses in the same subnet.

4. The method of generating a network address blacklist of claim 1, wherein activity data comprises number of honeypots attacked, time from first to last attack, time since last attack, mean time of attacks, and/or time from last attack from the same /24, ASN or other subnet.

5. The method of generating a network address blacklist of claim 1, wherein a weighting of activity data in analyzing the activity data to generate the score indicative of a predicted likelihood of future attack is determined by logistic regression using historic data.

6. The method of generating a network address blacklist of claim 5, wherein weighting of activity is performed by sorting activity data into a bin based on the activity data value.

7. The method of generating a network address blacklist of claim 1, further comprising distributing the network address blacklist to one or more of a firewall, antivirus software, antimalware software, network security device, and a cloud security service.

8. The method of generating a network address blacklist of claim 1, wherein the analyzed activity data comprises only data within a recent time period.

9. The method of generating a network address blacklist of claim 8, wherein the constructed network address blacklist is smaller than a list of attacker network addresses during the recent time period.

10. The method of generating a network address blacklist of claim 1, wherein the plurality of honeypots comprise honeypots in different locations on a public network.

11. A computerized network security system, comprising:
    hardware comprising a processor, a memory, a nonvolatile machine-readable storage medium, and a network interface; and
    a blacklist generation module comprising instructions stored on the nonvolatile machine readable medium that when executed on the processor are operable to cause the computerized network security system to:
    collect activity data from a plurality of honeypots comprising network address of attacks and time of attacks,
    analyze activity data from plurality of honeypots to generate a score indicative of a predicted likelihood of future attack from network addresses in the activity data, and
    construct a network address blacklist including network addresses predicted likely to be a source of a future attack based on the generated score being greater than a threshold value;
    wherein the computerized network security system is configured to repeat the collecting, analyzing, and constructing over time such that each past threat is iteratively reassessed over time and the score indicative of a predicted likelihood of future attack is updated to reduce a size of maintaining the generated network address blacklist by removing the network addresses from the blacklist that had no recent honeypot attack activity based on the generated score.

12. The computerized network security system of claim 11, wherein the network address comprises an Internet Protocol (IP) address or a range of IP addresses in the same subnet.

13. The computerized network security system of claim 11, wherein activity data comprises number of honeypots attacked, time from first to last attack, time since last attack, mean time of attacks, and/or time from last attack from the same /24 subnet.

14. The computerized network security system of claim 11, wherein a weighting of activity data in analyzing the activity data to generate the score indicative of a predicted likelihood of future attack is determined by logistic regression using historic data.

15. The computerized network security system of claim 11, the blacklist generation module instructions further operable when executed to distribute the network address blacklist to one or more of a firewall, antivirus software, antimalware software, and a cloud security service.

16. A computerized network security honeypot system, comprising:
hardware comprising a processor, a memory, a nonvolatile machine-readable storage medium, and a network interface; and
a network attack monitoring module comprising instructions stored on the nonvolatile machine readable medium that when executed on the processor are operable to cause the computerized network honeypot system to collect activity data related to network attacks on the honeypot,
the activity data comprising a score indicative of a likelihood of future attacks from the same network address including network address of attacks and time of attacks, the network attack monitoring module operable to report the collected activity data to a blacklist creation module operable to analyze the activity data to generate a blacklist including network addresses predicted likely to be a source of a future attack based on the score being greater than a threshold value, and wherein each past threat os iteratively reassessed over time and the score indicative of a predicted likelihood of future attacl is undated to reduce a size of maintaining the generated network address blacklist by removing the network addresses from the blacklist that had no recent honeypot attack activity based on the generated score.

17. The computerized network security honeypot system of claim 16, the instructions further operable when executed to cause the computerized network honeypot system to report the collected activity data to a remote computerized security system executing the blacklist creation module.

18. The computerized network security honeypot system of claim 17, wherein the computerized network honeypot system is configured to repeat the collecting and reporting over time such that the score indicative of a predicted likelihood of future attack is updated over time and such that the remote computerized security system receives periodically updated data.

19. The computerized network security honeypot system of claim 16, wherein activity data further comprises number of attacks, time from first to last attack, time since last attack, mean time of attacks, and/or time from last attack from the same subnet.

20. The computerized network security honeypot system of claim 16, wherein the honeypot system further comprises a honeypot module designed to attract attacks by mimicking a computerized system exposed to a public network.

\* \* \* \* \*